United States Patent [19]

Onno et al.

[11] Patent Number: 4,667,320

[45] Date of Patent: May 19, 1987

[54] SPACE-DIVISION SWITCHING NETWORK FOR HIGH DATA RATE SIGNALS

[75] Inventors: Guy Onno, St Quay Perros; Jean-Yves Jaouen, Lannion, both of France

[73] Assignee: Compagnie Industrielle des Telecommunications Cit-Alcatel, Paris, France

[21] Appl. No.: 716,263

[22] Filed: Mar. 26, 1985

[30] Foreign Application Priority Data

Apr. 2, 1984 [FR] France ................... 84 05163

[51] Int. Cl.⁴ ............... H04Q 11/04; H04L 15/00
[52] U.S. Cl. ............... 370/58; 340/825.79; 178/3
[58] Field of Search ............ 370/58, 63, 64; 340/825.79; 178/3

[56] References Cited

U.S. PATENT DOCUMENTS 4,300,230 11/1981 Philip et al. ............... 370/63
4,402,074 4/1983 Cupuis et al. ............. 370/14
4,412,322 10/1983 Briley et al. ............... 370/58

FOREIGN PATENT DOCUMENTS 0027226 4/1981 European Pat. Off. .
0034776 9/1981 European Pat. Off. .
0056600 7/1982 European Pat. Off. .
0097360 1/1984 European Pat. Off. .
2836695 3/1980 Fed. Rep. of Germany .

OTHER PUBLICATIONS

IEEE Transactions on Aerospace and Electronic System—vol. AES–16 No. 2, Mar. 1980—A. S. Acampora et al., "Frame Synchronizer Concept for TDMA Burst Modems"—pp. 169–179.

Primary Examiner—Douglas W. Olms
Assistant Examiner—Frank M. Scutch, III
Attorney, Agent, or Firm—Sughrue, Mion, Zinn, Macpeak and Seas

[57] ABSTRACT

A multi-stage space-division switching network comprises groups of regenerators (RE1 to RE16) connected to input lines and to output lines of the switching network, it further includes groups of regenerators (RS1 to RS16) connected to a first end of intermediate links (LI1 to LI28) interconnecting two stages and groups of regenerators (R3.1 to R3.16) connected to the other ends of the intermediate links. A monitoring device comprises sampling devices (P) connected to the groups of regenerators and to a comparator circuit (CC). A main marker (MQP) receives connection instructions and sampling instructions and transmits these instructions to auxillary markers (MQ) which control the sampling circuits (P) and the switching circuits (C1, C2) of the switching network.

5 Claims, 8 Drawing Figures

SPACE-DIVISION SWITCHING NETWORK FOR HIGH DATA RATE SIGNALS

The invention relates to a space division switching network for switching digital signals at high data rates, e.g. about 100 Mbit/s, and usable inter alia in exchanges of wide band digital networks, such as high quality visiophone networks, for example.

BACKGROUND OF THE INVENTION

Switching devices in general are well known to the person skilled in the art, in particular concerning their architecture, their implementation and specifically their implementation for switching digital signals.

A general structure for switching networks can be found in an article by C. Clos entitled "A study of nonblocking switching networks" in BSTJ Vol. 32, No. 2, March 1953, pages 406–425. An article entitled "Switching, synchronizing and signalling in PCM exchanges" by W. Neu and A. Kuendig at the Colloque International de Commutation Electronique held in Paris, Mar. 28th to Apr. 2nd 1966 at pages 513–520 as published by Chiron in Paris, relates more particularly to a time-division switching system.

These low data rate devices implement relatively slow technologies and do not take account of the constraints specific to processing fast digital signals, which constraints are:

implementing high performance technology;

improving inter-stage links, since processing high speed signals require short transit times, in particular in transmission systems between stages or between cards;

signal regeneration, since in spite of the precautions taken in suitably choosing the technology for transmission systems, the shape of the digital signals is progressively degraded and it is essential to regenerate these signals both in amplitude and in phase; and the supervision system: if a passive monitoring system is chosen for reasons of economy and simplicity of implementation, the device must take into account the fact that the time taken to transfer data from one point to another of the switching network is large and indeterminate relative to the period of the signals being transferred.

The supervision of low data rate devices is generally based on a communication monitoring process which verifies, either continuously or by sampling:

that the paths taken match the call data; and that the various transmission means and switching means implicated in a particular path are functioning correctly.

Continuous monitoring of communications can only be performed in duplicated systems operating in microsynchronism, i.e. phase synchronized at the bit level.

Monitoring by sampling avoids the need to duplicate the switching network and can be done in two different ways:

active monitoring consists in inserting known data to the input of the network and in observing the data which arrives at the output, and optionally at various intermediate points; and passive monitoring consists in observing various points along the itinerary of a normally connected signal or a representative sample of said signal and in comparing these signals or samples as obtained from the various points.

In broad band networks, continuous monitoring is difficult to implement because of technical constraints associated with operating in microsynchronism.

In active monitoring, injecting a code in a reserved sector and recognizing it in analysis systems requires the entire signal to be processed and thus leads to apparatus which is particularly complex and expensive.

In passive monitoring, a variable number of signal selectors need to be installed in the switching chain, together with comparators. In practice, it is impossible to directly compare high data rate signals because of the technological complexity required to transmit such signals and to compare them.

Further, compared with conventional methods of supervising switching networks, a new parameter must be taken into account: this parameter is the error rate of the monitored connection. Taking account of the component parts of a broadband connection chain, it is important to be able to evaluate the quality of a connection which is considered as being properly established in order to be able to monitor any changes or drift in said quality.

Preferred embodiments of the invention provide a switching network suitable for high data rate digital signals, together with a device for monitoring the high data rate digital signals.

SUMMARY OF THE INVENTION

The present invention provides a space switching network for high data rate digital signals, the network having inlet lines and outlet lines connected thereto and comprising a plurality of stages with at least two consecutive stage being interconnected by a set of intermediate lines, each stage including switching matrices, said network further including regenerator modules at its inlets, at its outlets and at each end of its intermediate lines, the regenerator modules at its inlets and at its outlets being connected to respective input lines and output lines, each regenerator module including means for recovering a clock rate from the high data rate digital signals passing therethrough and serving to correct degradation in the digital signals due to their passage through the switching matrices and through the intermediate lines.

A switching network in accordance with the invention may be used for switching high data rate digital signals, e.g. at 100 M bits/s or more. It implements high performance technology and takes account of the constraints related to processing high speed digital data trains: inter-stage links, signal regeneration at various points in the network, and a supervision or proper operation monitoring system based on passive monitoring by taking samples from various regeneration points and comparing the samples of a digital signal taken from both ends of a path through the switching network, the samples being compared bit by bit and the supervision system being independent of dispersions in propagation times through the switching network.

The space-division switching network in accordance with the invention thus comprises two main portions:

a switching assembly including signal regeneration devices; and a supervision system.

BRIEF DESCRIPTION OF THE DRAWING

A preferred implementation of the invention is now described by way of example with reference to the accompanying drawings, in which.

MORE DETAILED DESCRIPTION

Figure 1:
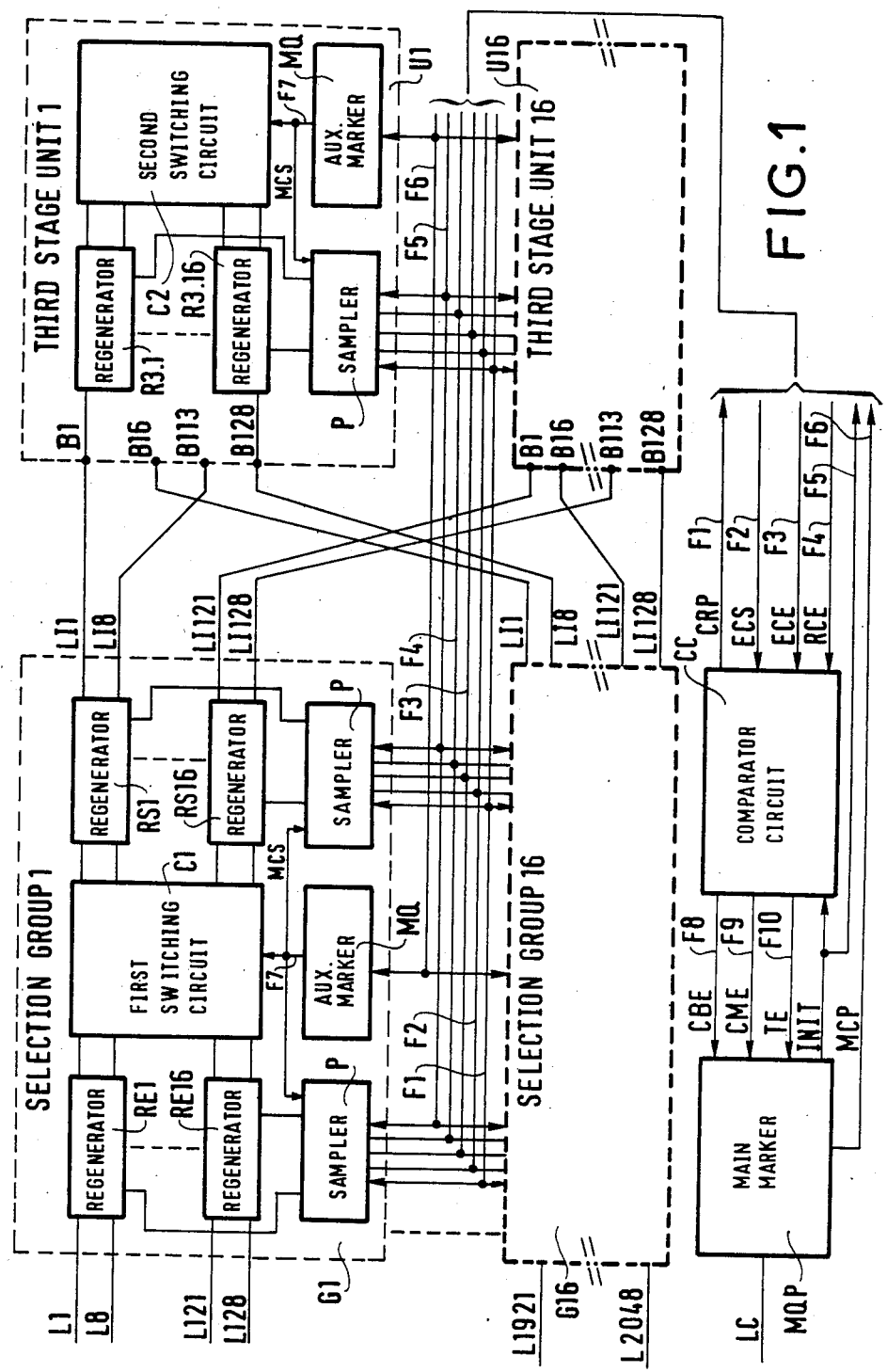
FIG. 1 shows a space-division switching network for high data rate digital signals in accordance with the invention.

FIG. 1 shows a space-division switching network for high data rate digital signals in accordance with the invention. The data rate may be 96 Mbit/s for example. The switching network is of the folded three stage type as is explained in the following description. The switching network shown in FIG. 1 comprises selection groups G1 to G16 third stage units U1 to U16, a main marker MQP, and a comparator circuit CC.

Each selection group is connected to one-hundred and twenty eight two-way links L1 to L128 for the selection group G1 and L1921 to L2048 for the selection group G16, each link having one inlet line and one outlet line for the input and output of data into the switching network. Each selection group G1 to G16 is connected to third stage units U1 to U16 by one-hundred and twenty-eight intermediate links LI1 to LI128 which convey data in both directions.

A selection group comprises a first switching circuit C1, regenerator groups RE and RS, an auxiliary marker MQ, and two sampling devices P. The links L1 to L128 are connected to the first switching circuit C1 by sixteen groups of regenerators RE1 to RE16, i.e. eight links per group of regenerators. The intermediate links LI1 to LI128 are connected to the first switching circuit C1 via sixteen groups of regenerators RS1 to RS16, i.e. eight intermediate links per group of regenerators. The auxiliary marker MQ is connected by a line F7 to two sampler devices P and to the first switching circuit C1; the auxiliary marker MQ delivers serial messages MCS over the line F7.

The sixteen groups of regenerators RE1 to RE16 connected to the links L1 to L128 are also connected to one of the sampler devices, and the sixteen regenerator groups RS1 to RS16 connected to the intermediate links LI1 to LI128 are connected to the other sampler circuit.

A third stage unit comprises a second switching circuit C2, sixteen regenerator groups R3.1 to R3.16, an auxiliary marker MQ, and a sampler device P. The auxiliary marker MQ delivers serial messages MCS via a line F7 to the second switching circuit C2 and to the sampler circuit. The sampler circuit P is connected to each of the of the groups of regenerators. A third stage unit has one hundred and twenty-eight terminals B1 to B128 connected to the sixteen groups of regenerators. Its connections to the selection groups are conventional. The third stage unit U1 has its terminal B1 to B16 connected via intermediate lines LI1 to the sixteen selection groups; its terminals B17 to B32 are connected by intermediate lines LI2 to the sixteen selection groups, . . . etc., and its terminals B113 to B128 are connected by intermediate lines LI8 to the sixteen selection groups. The next third stage unit U2 has its terminals connected by the intermediate lines LI9 to LI16 to the sixteen selection groups, and the last third stage unit U16 is connected by the intermediate lines LI121 to LI128 to the sixteen selection groups.

The main marker MQP is connected to a central computer via a link LC. The central computer which controls the switching network determines the parameters of each path for connecting any pair of two-way links Li and Lj through the switching network, and generates marking messages for activating appropriating switching points in the first and second switching circuits C1 and C2. The main marker MQP delivers marking messages MCP to the auxiliary markers MQ of the selection groups and the third stage units via a line F6, and it delivers an initializing signal INIT to the comparator circuit CC and to the sampler devices P of the selection groups and the third stage units via a line F5.

The main marker MQP receives a connection properly established signal CBE from the comparator circuit CC over a wire F8 and a connection badly established CME over a wire F9, together with an error rate signal TE over a wire F10.

The sampler devices P in the selection groups G1 to G16 and in the third stage units U1 to U16 are connected to the comparator circuit CC over lines F1, F2, F3 and F4. The sampler devices deliver output signal samples ECS over the line F2, input signal samples ECE over the line F3, with the samples being taken from the input and the output of a circuit being monitored, and clock signals RCE associated with the input signal samples over the line F4. The clock signal could equally well be associated with the output signal samples, but the completed system is hardwired one way or the other. The comparator circuit CC delivers phase adjusting control signals CRP to the sampler circuits over the line F1.

Figure 2:
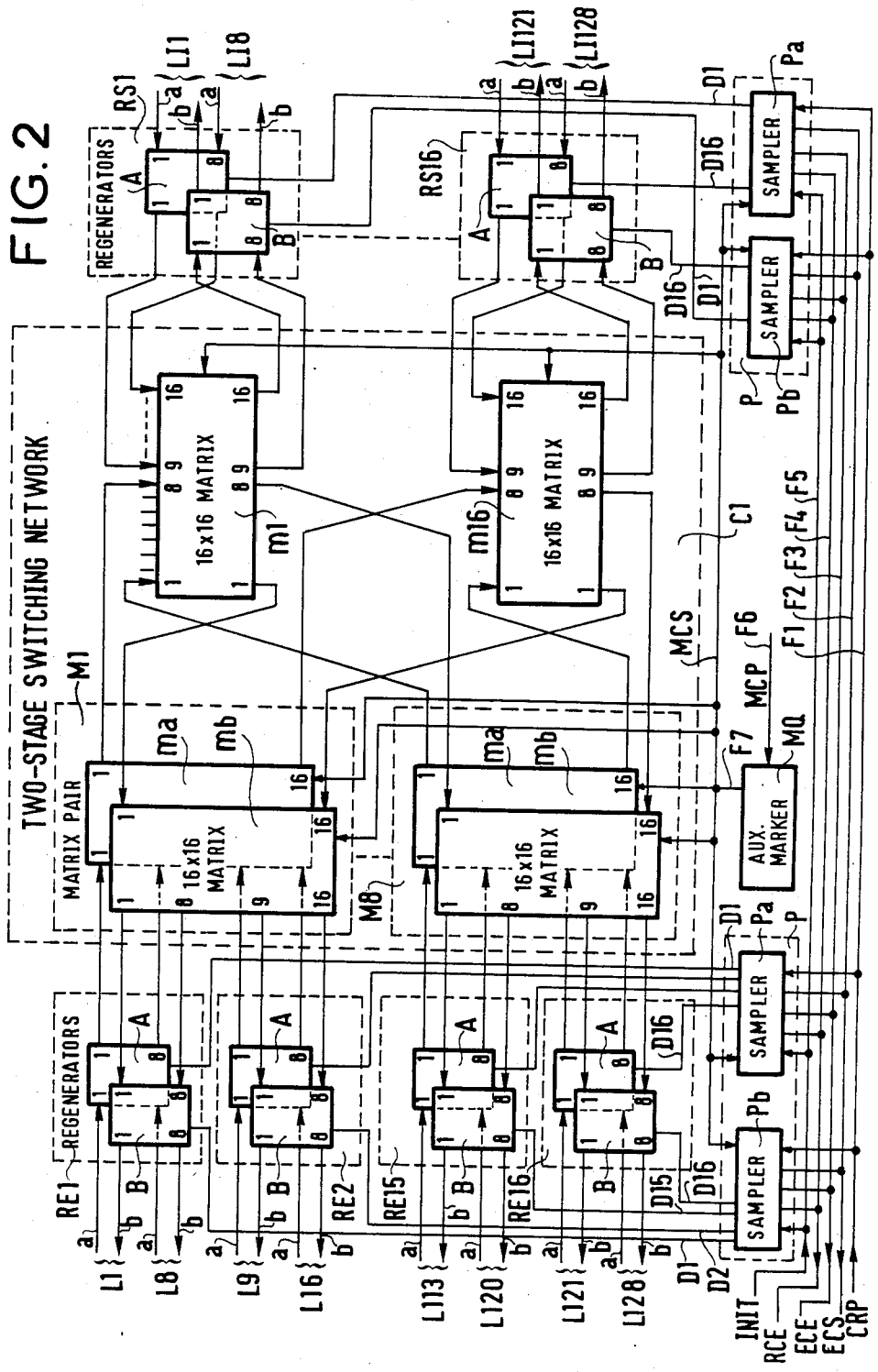
FIG. 2 shows a selection group from FIG. 1.
Figure 5:
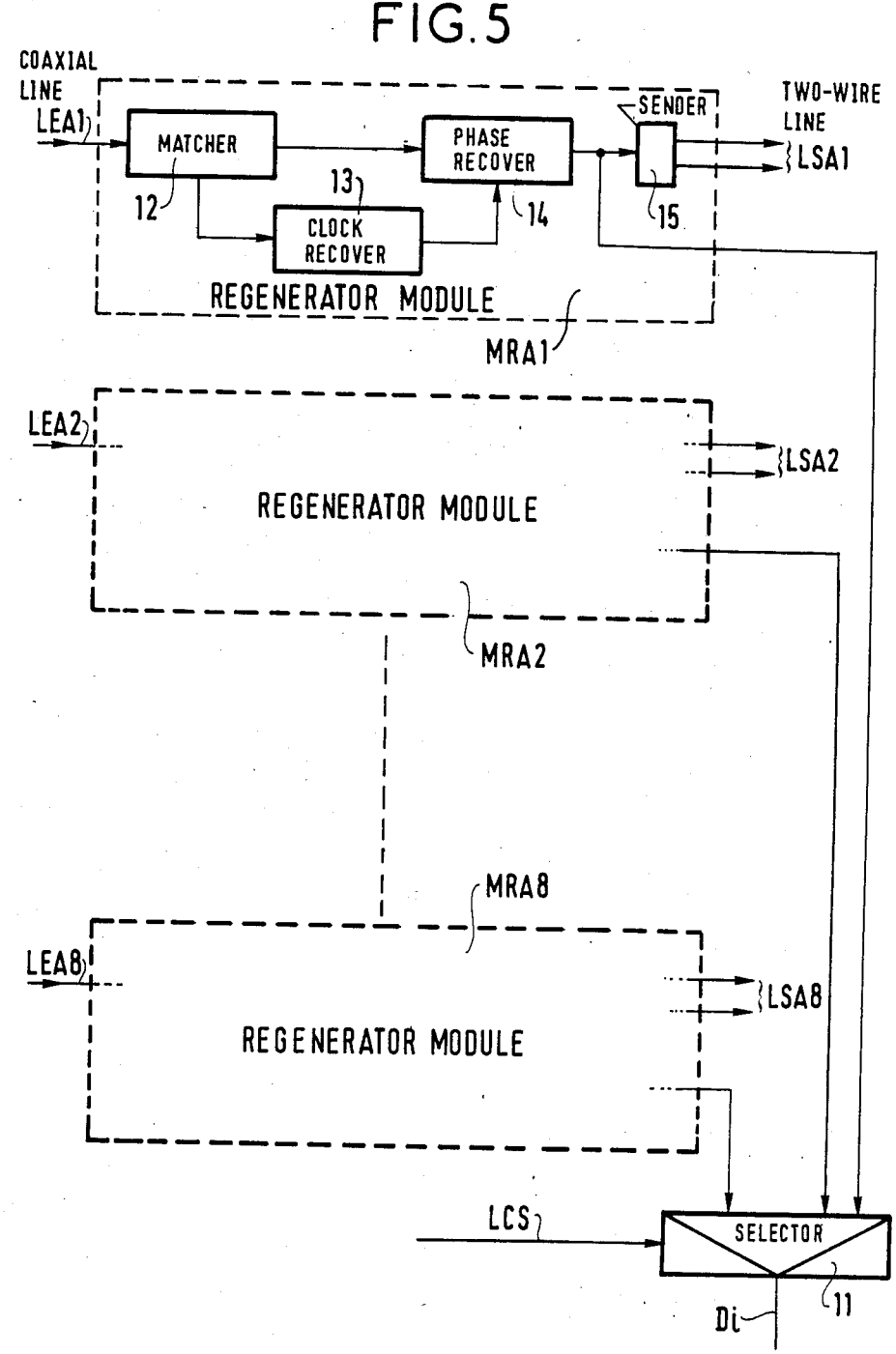
FIG. 5 shows a set of asymmetrical input regenerators for the switching network.
Figure 6:
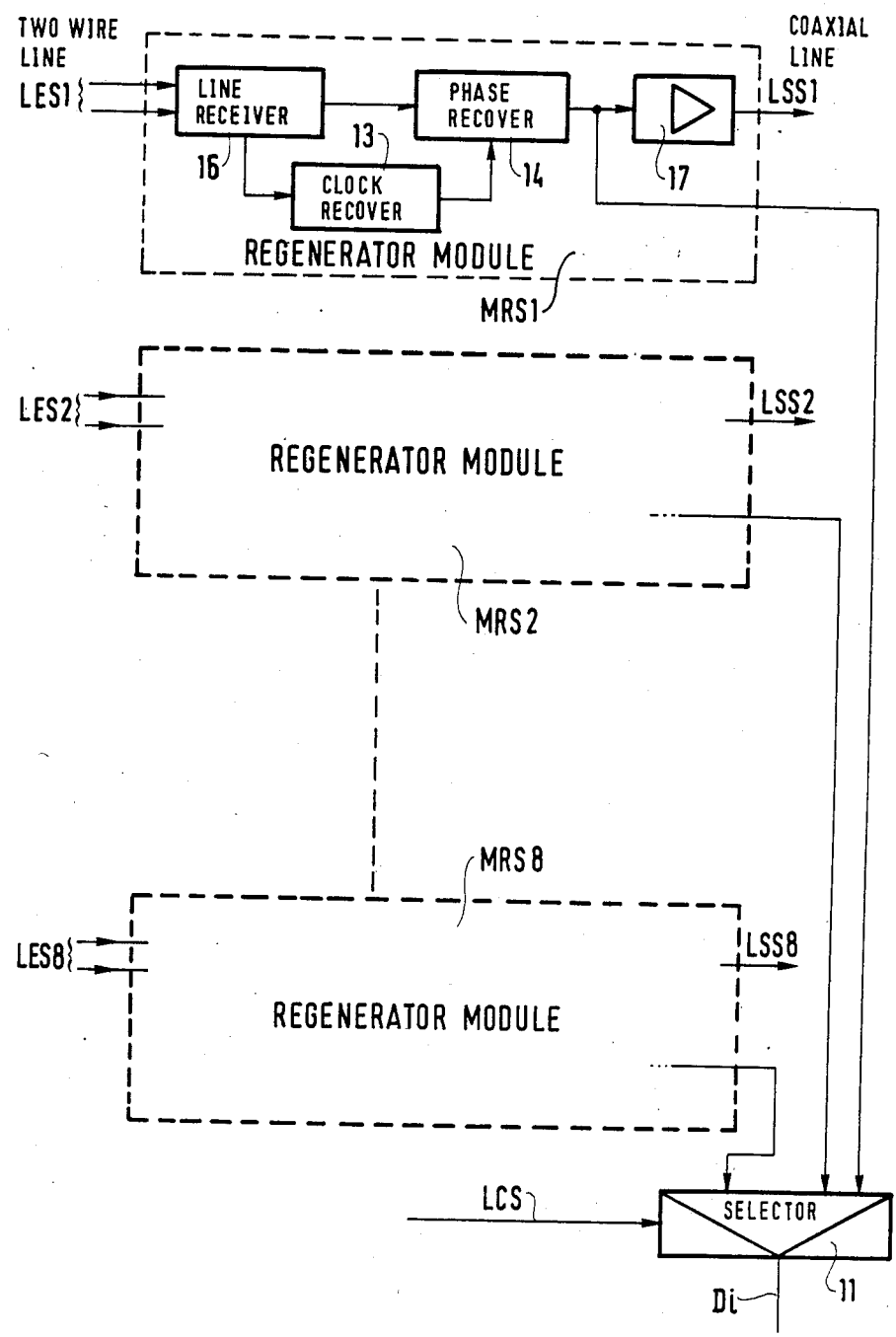
FIG. 6 shows a set of symmetrical input regenerators for the switching network.

FIG. 2 shows the selection group G1 of FIG. 1. Each group of regenerators RE1 to RE16 and RS1 to RS16 is constituted by two sets of regenerators A and B, each set including eight regenerators as shown in FIGS. 5 and 6. The sampler devices P each comprise two identical sampler circuits Pa and Pb. The sampler circuits Pa and Pb are connected via links D1 to D16 to the regenerator assemblies A and B respectively, of the regenerator groups RE1 to RE16 or RS1 to RS16 associated with the sampler device P in question. Each sampler circuit Pa and Pb is connected to the lines F1 to F5.

Each link L1 to L128 is constituted by two lines a and b, each of which deals with transmission in one direction. The lines a convey data entering the switching network and thus entering the selection groups, while the lines b convey data leaving the switching network and thus leaving the selection groups. The lines a of the links are connected to the sets of regenerators A and the lines b are connected to the sets of regenerators A and the lines b are connected to the sets of regenerators B.

Figure 4:
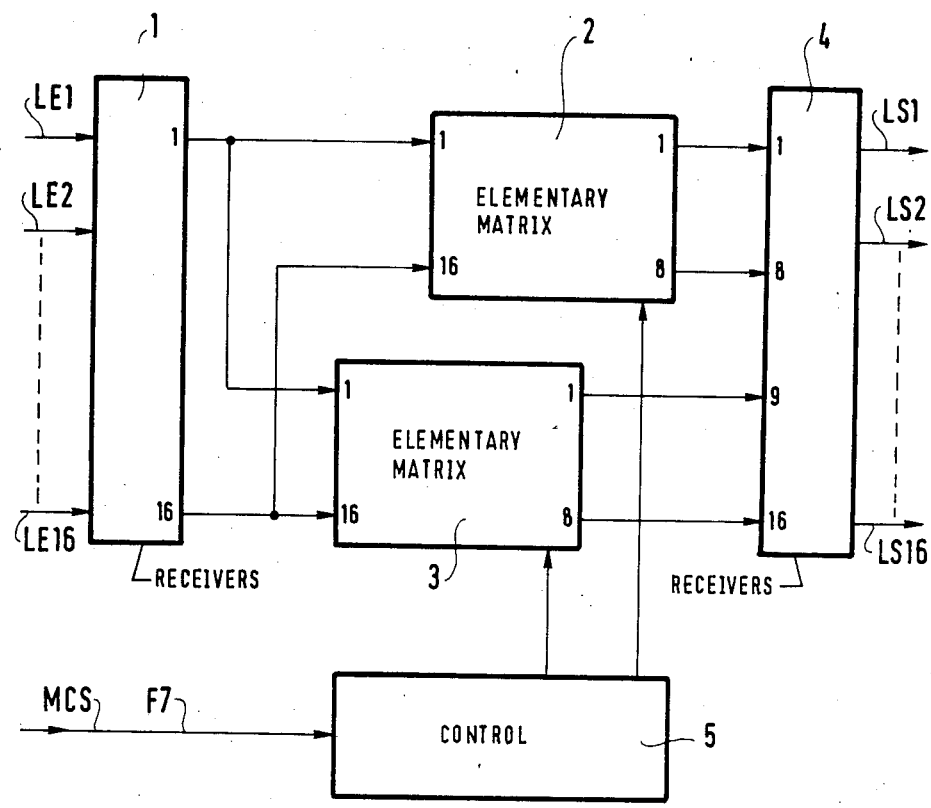
FIG. 4 shows a switching matrix used in the selection groups and the third stage units.

The first switching circuit C1 comprises two switching stages, the first stage being constituted by pairs of matrices M1 to M8 and the second stage being constituted by matrices m1 to m16. Each pair of matrices M1 to M8 is constituted by two matrices ma and mb. The matrices ma, mb, m1 to m16 are identical to one another and each comprises sixteen inputs and sixteen outputs. FIG. 4 shows the circuit of one such matrix. Each pair of matrices is connected to two groups of regenerators, with the pair of matrices M1 being connected to the groups of regenerators RE1 and RE2, and the pair of matrices M8 being connected to the groups of regenerators RE15 and RE16. In a pair of matrices, each of the matrices ma and mb deals with transmission in one direction only, with the matrix ma having its sixteen inputs connected to two sets of regenerators A and the matrix mb having its sixteen outputs connected to two sets of regenerators B in two groups of regenerators which are associated with the pair of matrices. Each matrix m1 to m16 of the second stage is connected via its inputs to each of the matrices ma of the eight pairs of matrices M1 to M8 and via its outputs to each of the matrices mb of the pairs of matrices M1 to M8. Each matrix m1 to m16 of the second stage is connected to a respective group of regenertors RS1 to RS16, with one matrix being connected via its input to the set of regenerators A of the groups of regenerators with which it is associated and via its outputs to the set of regenerators B of the associated group of regenerators. The intermediate links LI1 to LI128 are constituted by pairs of wires a and b, with the a wires conveying information from the third stage units U1 to U16 and the b wires conveying information to the the third stage units.

The auxiliary marker MQ is connected via the line F7 to each of the matrices ma and mb in the pairs of matrices M1 to M8 and to each of the matrices m1 to m16, and is also connected to each of the sampling circuits Pa and Pb of the sampling devices P.

Figure 3:
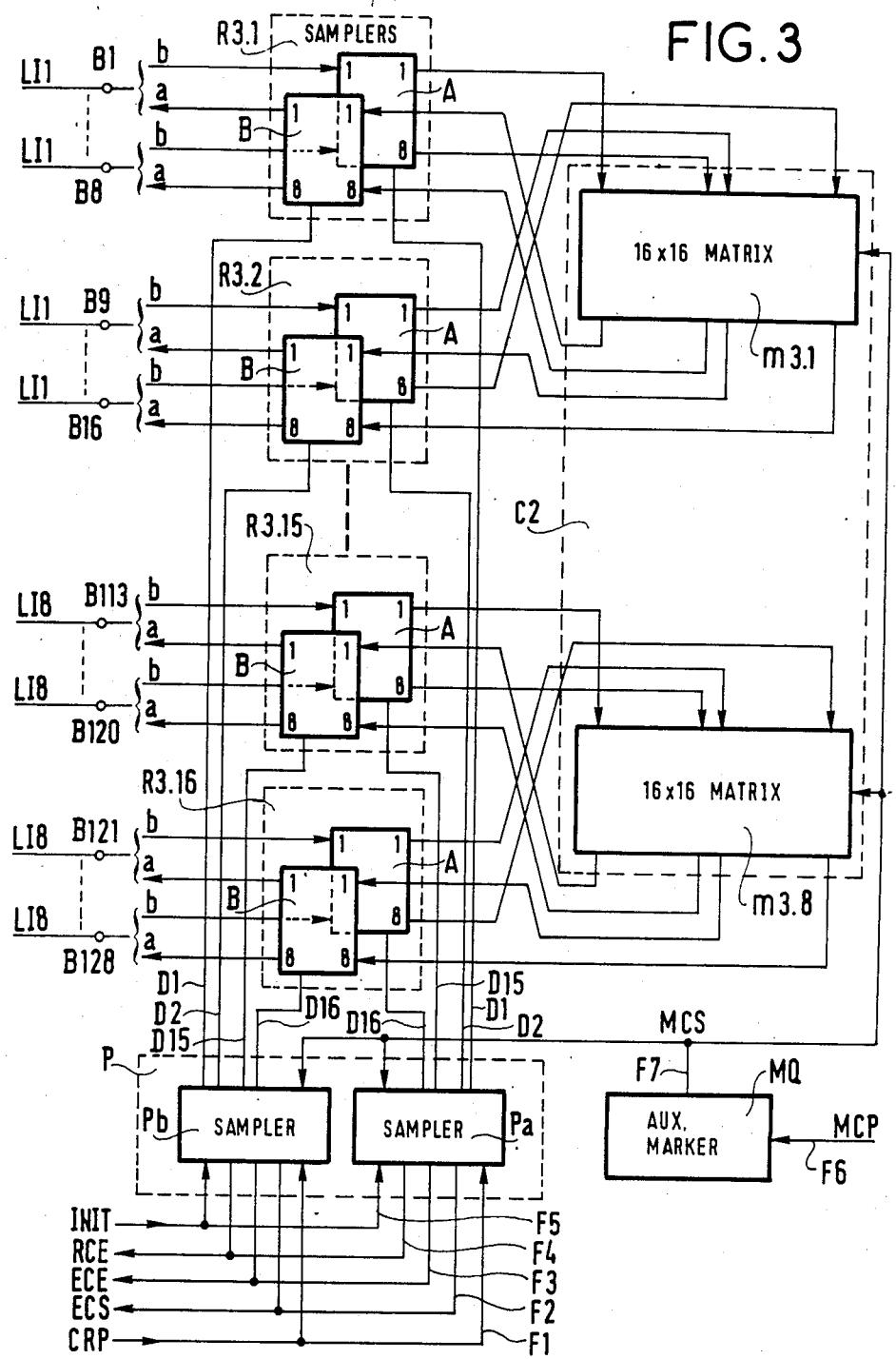
FIG. 3 shows a third stage unit from FIG. 1.

FIG. 3 shows a third stage unit, for example the third stage unit U1.

The groups of regenerators R3.1 to R3.16 are constituted, like the groups of regenerators RE and RS of the selection groups (FIG. 2), by two sets of regenerators A and B. The terminals B1 to B16 are connected to sixteen selection groups via the intermediate links LI1, with each terminal being connected to one selection group. The terminals B113 to B128 are connected to the sixteen selection groups via the intermediate links LI8, with each terminal being connected to one selection group. Since the intermediate groups are each constituted by two wires a and b, as indicated in the description of FIG. 2, the a wires are connected to the regenerator assemblies B and the b wires are connected to the regenerator assemblies A. The b wires convey data into the third stage unit and the a wires convey data out from the third stage unit.

The second switching circuit C2 is constituted by eight matrices m3.1 to m3.8 which are identical to the matrices m1 to m16, ma and mb of the first switching circuit C1. Each matrix has its inputs connected to the sets of regenerators A and its outputs connected to the sets of regenerators B of two consecutive groups of regenerators. The matrix m3.1 is thus connected to the two groups of regenerators R3.1 and R3.2, the matrix m3.2 is connected to the two following groups of regenerators, and the matrix m3.8 is connected to the two groups of regenerators R3.15 and R3.16. The sampling device P includes two sampling circuits Pa and Pb, in the same manner as the sampling devices of the selection groups. The sampling circuits Pa and Pb are each connected via links D1 to D16 to groups of regenerators, the sampling circuit Pa being connected to the sets of regenerators A and the sampling circuit Pb being connected to the set of registers B. The sampling circuits Pa and Pb are each connected to the lines F1 to F5. The auxiliary marker MQ is connected to the line F6, and to the sampling circuits Pa and Pb and to the matrices m3.1 to m3.8 over the line F7.

FIG. 4 shows one matrix, having sixteen inputs and sixteen outputs, constituted by a set of receivers 1, two elementary matrices 2 and 3, a set of senders 4, and a control circuit 5. There are sixteen receivers in the set of receivers with each receiver receiving symmetrical signals over a two-wire inlet line LE1 to LE16 and reconstituting ECL (Emitter Coupled Logic) level signals on a single wire. A receiver sends a signal of value 1 if its positive input is at a greater voltage than its negative input and a signal of value 0 otherwise. The output of each receiver is connected to one input of the two elementary matrices 2 and 3 each of which has sixteen inputs and eight outputs. The set of senders 4 includes sixteen senders, each sender being connected to one output from the elementary matrices, and receiving an ECL level signal therefrom over one wire. Each sender delivers two symmetrical signals, one being the inverse of the other, at ECL levels over the two wires of an output two-wire line LS1 to LS16. The control circuit 5 has its input connected to the line F7 over which it receives serial messages MCS from the controlling auxiliary marker; its outputs are connected to each of the elementary matrices to set up or to break connections between the inputs and the outputs of the elementary matrices.

FIG. 5 shows a set of regenerators A from FIGS. 2 and 3. Such a set of regenerators is reconstituted by eight asymmetrical input regenerator modules MRA1 to MRA8, and a selector 11. Each regenerator module comprises: a matching circuit 12 having its input connected to a coaxial line and including a fixed equalizer of known type for compensating loss irregularities as a function of frequency for a coaxial pair of average length, a clock recovery circuit 13 of known type and based, for example, on a passive pass-band filter such as a surface wave filter, a phase recovery circuit 14 which may be a D-type bistable, and a sender 15 delivering symmetrical signals over a two-wire line. The output from the matching device 12 is connected to the phase recovery circuit 14 whose output is connected to the sender 15. The input of the clock recovery circuit 13 is also connected to the matcher circuit 12 and its output delivers a recovered clock signal which controls the phase recovery circuit 14.

The selector 11 has eight inputs each connected to the output from a corresponding one of the phase recovery circuits 14 in a single regenerator module. The output of the selector is connected via a link Di to the sampling circuit Pa with which it is associated (FIGS. 2 and 3). A control input to the selector is also connected to the sampler circuit Pa via a select control line LCS.

The matching devices 12 have their inputs connected to incoming coaxial lines LEA1 to LEA8 respectively and the senders have their outputs connected to outgoing twowire lines LSA1 and LSA8 respectively.

The sampling circuit Pa selects one of the inputs to the selector 11 by applying a control signal to the selection control line LCS, thereby selecting one of the regenerator modules. The digital signal delivered by the phase recovery circuit 14 of the selected regenerator module is then transmitted over the link Di to the sampling circuit Pa which thus receives a digital signal at 96 Mbit/s.

FIG. 6 shows a set of regenerators B from FIGS. 2 and 3. Such a set of regenerators is constituted by eight symmetrical input regenerators MRS1 to MRS8 and a selector 11. Each regenerator module comprises a line receiver 16, a clock recovery circuit 13, a phase recovery circuit 14 and a send amplifier 17. The line receivers have their inputs connected to two-wire input lines LES1 to LES8 respectively and the send amplifiers 17 have their outputs connected to outgoing coaxial lines LSS1 to LSS8.

The selector 11 has eight inputs each connected to the output from the phase recovery circuit 14 of one of the regenerator modules. The output from the selector is connected via a link Di to the sampling circuit Pb with which it is associated (FIGS. 2 and 3). A selector control input is connected to the sampling circuit Pb via a selection control line LCS. The sampling circuit Pb selects one of the inputs to the selector 11 by applying a command to the selection control line LCS, thereby selecting one of the regenerator modules. The digital signal delivered by the phase recovery circuit 14 of the selected regenerator module is then transmitted over the link Di to the sampling circuit Pb which thus receives a digital signal at 96 Mbit/s.

Figure 7:
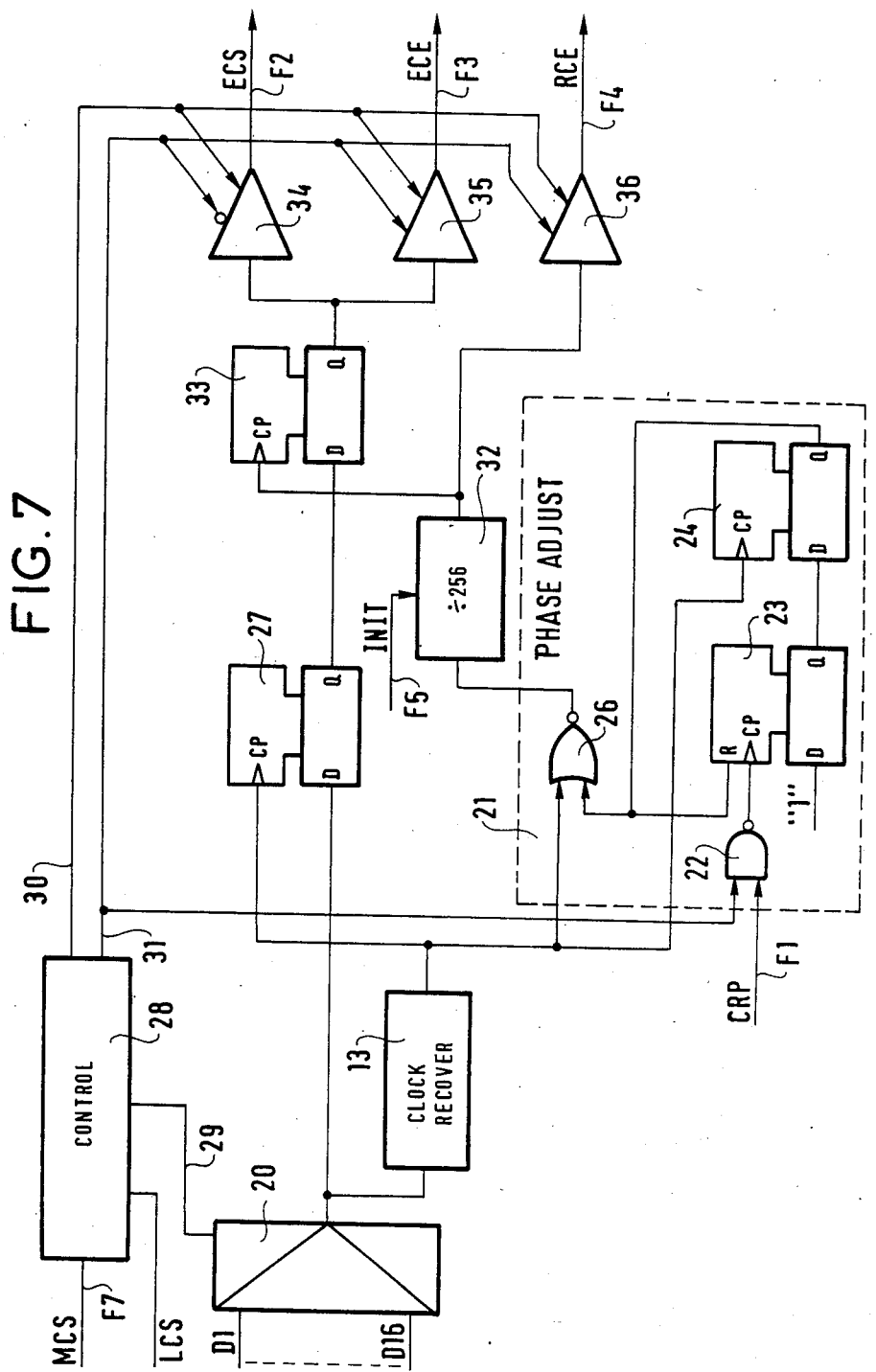
FIG. 7 shows a sampler circuit Pa or Pb from FIGS. 2 and 3.

FIG. 7 shows a sampler circuit Pa or Pb from FIGS. 2 and 3. A control circuit 28 has its input connected via the line F7 to the controlling auxiliary marker MQ, with the line F7 conveying serial messages MCS which indicate to the control circuit whether the sampling circuit is concerned, i.e. whether samples need to be taken from one of the regenerator modules connected to the sampling circuit in question. The serial message also indicates whether the regenerator module is at the beginning or the end of the portion of circuit being monitored, the number of the regenerator module and the number of the link Di connecting the sampler circuit to the selector 11 of the set of regenerators to which the regenerator module in question belongs (FIGS. 4 and 5).

If the sampling circuit is concerned by the serial message, its control circuit 28 delivers a 1 value signal on a wire 30. The sampling circuit delivers a 0 value signal on a wire 31 if the sampling is to take place at the beginning of a monitored portion and the value 1 if the sampling is to take place at the end of a monitored portion. The control circuit also delivers on the basis of the serial message instructions for performing the sampling. It delivers a three-bit word over the selection control LCS which connects it to the sixteen selectors 11 in a set of regenerators A or B, with the three-bit word designating the number of the regenerator module concerned with the sample. It delivers a four-bit word over a link 29 which connects it to the control input of a selector 20 to select one of the links Di from the links D1 to D16 connecting the selectors 11 to the inputs of the selector 20 (which selectors are naturally the selectors of the sixteen regenerator sets, A or B, associated with the sampling circuit). Thus, when the sampling circuit is to obtain a sample, it selects a regenerator module via the selection control line LCS, which selection takes place in all the selectors 11 of the regenerator sets controlled by the sampling circuit. Further, it selects one of the links Di out of the sixteen links D1 to D16 by means of the link 29, whereby the sampling circuit takes account only of the digital signal coming from the regenerator module selected by the selection control link LCS and having its selector 11 connected to the selector 20 over the selected link Di.

The output from the selector 20 is connected both to the D input of a D-type bistable 27 and to the input of a clock recovery circuit 13. The output from the clock recovery circuit 13 is connected to the clock input of the bistable 27 and to a phase adjusting circuit 21 which includes a NAND gate 22, two D-type bistables 23 and 24, and a NOR gate 26. The NAND gate 22 has one input connected to the wire 31 from the control circuit 28 and has its other input connected to the line F1 from which it receives a phase adjusting signal CRP from the comparator circuit CC. The output from the NAND gate 22 is connected to the clock input of the bistable 23 which receives a permanent 1 value signal at its data input. The output from the bistable 23 is connected to the data input of the bistable 24 whose clock input is connected to the output from the clock recovery circuit 13. The output from the bistable 24 is connected to a reset to zero input of the bistable 23 and also to one input of the NOR gate 26 whose other input is connected to the output from the clock recovery circuit 13. The output from the NOR gate 26 is connected to the input of a divider 32 which divides by 256, and which has an initializing input connected to the wire F5 over which it receives an initializing signal INIT from the main marker MQP. The output from the divider 32 is connected to the clock input of a D-type bistable 33 whose data input is connected to the output from the bistable 27. The output from the bistable 23 is connected to the inputs of two amplifiers 34 and 35, with a third amplifier 36 having its input connected to the output from the divider 32. The amplifiers 34, 35 and 36 are amplifiers having three state outputs: logic level 0, logic level 1 and high impedance. Each of them has two control inputs connected to the wires 30 and 31 from the control circuit 28. The amplifier 34 has an inverting input connected to the wire 31. The output from the amplifier 34 is connected to the line F2 and delivers the output samples signal ECS. The output from the amplifier 35 is connected to the line F3 and delivers the input samples signal ECE. The output from the amplifier 36 is connected to the line F4 and delivers the clock signal RCE. If the sampling circuit is not being used, the wire 30 delivers a 0 value signal and all three amplifiers take a high impedance state. If the sampling circuit is being used, the signal on the wire 30 has the value 1, the signal on the wire 31 having either the value 1 in which case sampling is taking place at the end of the portion being sampled, i.e. the regenerator module in question associated with the sampling circuit is situated at the end of the portion being monitored, or else it has the value 0 if the sampling is taking place at the beginning of the portion being monitored, i.e. if the corresponding regenerator module associated with the sampling circuit is situated at the beginning of the portion being monitored. The signals on the wires 30 and 31 control the amplifiers such that one of the amplifiers 34 and 35 takes up logic level 0 and such that the amplifier 36 takes up logic level 0 only if the sampling is taking place at the beginning of the portion being monitored.

The divider 32 is initialized as are all the dividers of the sampling circuits.

Figure 8:
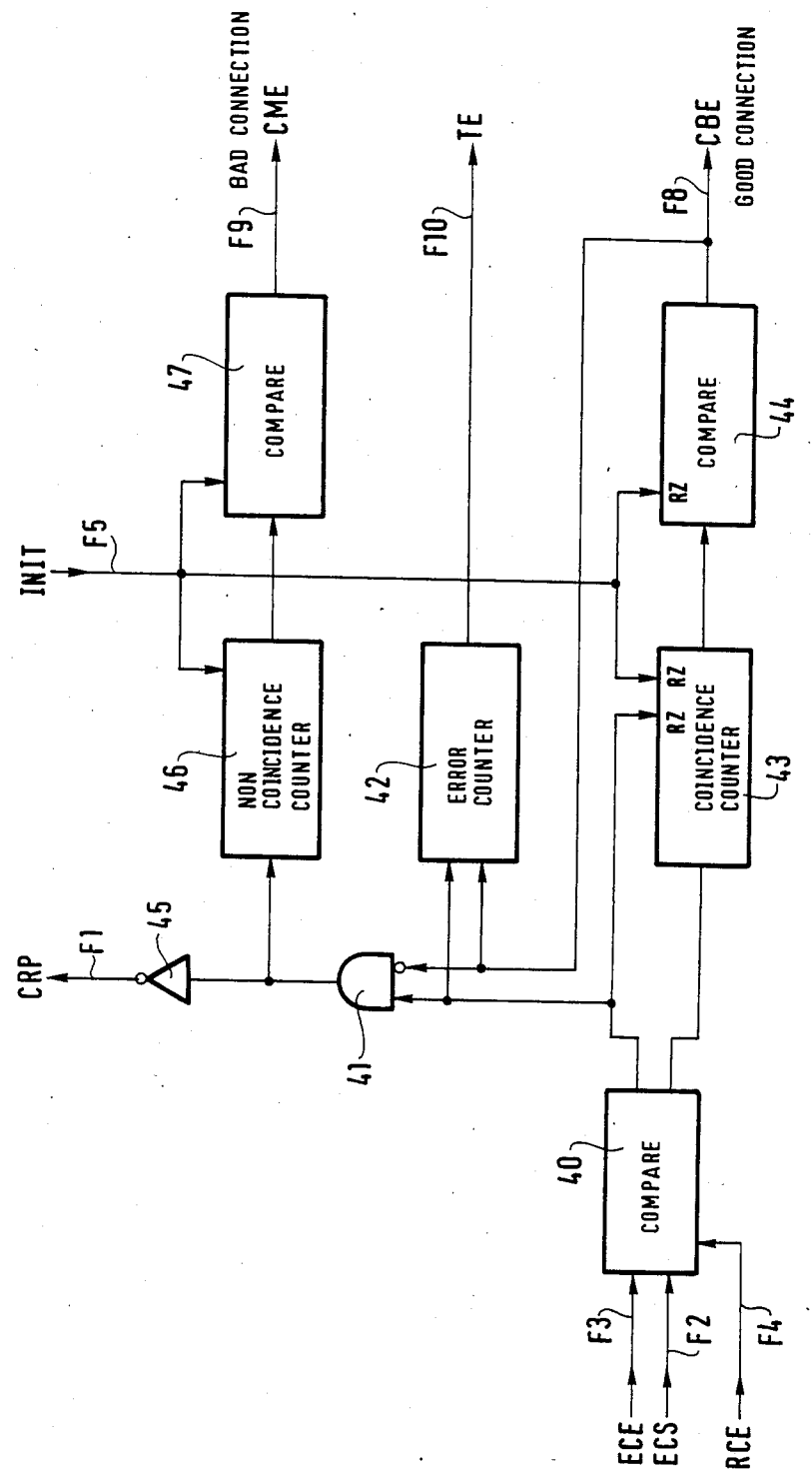
FIG. 8 shows a comparison circuit from FIG. 1.

Assume that the sampling circuit is sampling from the end of a monitored portion; it then operates as follows:

The signal on the wire 30 has the value 1 and the signal on the wire 31 also has the value 1. The selector 20 receives the digital signal at 96 Mbit/s from the regenerator module situated at the input to the monitored portion. The clock recovery circuit 13 delivers a clock signal recovered from the digital signal which it receives and controls the bistable 27 to set the phase of the digital signal received from the selector 20. The NAND gate 22 receives a logic level 1 signal over the wire 31 throughout the sampling period, i.e. throughout the period during which the operation of the monitored portion is being checked. In the absence of the phase correction signal CRP, the NAND gate 22 receives a level 1 signal from the line F1. The output from the gate 22 is thus at level 0 and the NOR gate 26 which receives a 0 level signal from the bistable 24 passes on the recovered clock signal as delivered by the clock recovery circuit 13. The divider 32 which has previously been initialized by the initializing signal INIT delivers one pulse every two-hundred and fifty-six pulses from the recovered clock signal. The bistable 33 which receives the digital signal at 96 Mbit/s from the bistable 27 is controlled by the divider 32 and thus delivers one bit in 256 from the digital signal. This bit is applied to the input of the amplifier 34 and is conveyed by the line F2 to the comparator circuit. When the comparator circuit CC detects non-coincidence by comparing one bit of the digital signal at the input of the monitored portion and one bit of the digital signal at the output of the monitored portion, it delivers a phase adjusting control signal CRP (the comparator circuit CC is shown in FIG. 8) on the line F1, and this signal has logic level 0. The NAND gate 22 then passes to level 1 and the outputs from the bistables 23 and 24 also pass to level 1, the bistable 23 then returns to level 0 and then the bistable 24 returns to 0. The output from the bistable 24 stays at level 1 during one period of the recovered clock signal and thus inhibits the NOR gate 26 in such a manner that one recovered clock pulse is not forwarded to the divider 32. The phase adjusting circuit 21 thus imposes a phase slip in the control of the bistable 33 which samples the digital signal.

When the sampling circuit of FIG. 7 is sampling from the beginning of a monitored portion, the NAND gate 22 receives a logic level 0 signal over the wire 31 and its output remains at level 1 regardless of the level of the phase adjusting signal CRP. The output from the bistable 24 is at level 0 and the NOR gate 26 passes the recovered clock signal without interruption. Sampling of the digital signal by the bistable 33 is thus free from phase adjustment and the amplifier 35 delivers the bits of the sampled digital signal from the bistable 33 over the line F3 at a steady phase relationship with the input 96 Mbit/s signal.

FIG. 8 shows the comparator circuit CC of FIG. 1. The comparator circuit compares samples taken from the beginning and the end of a monitored portion by the sampling circuits (FIG. 7). A comparator 40 has two inputs connected to the lines F2 and F3 respectively over which it receives one output sample signal ECS and one input sample signal ECE. The sampler is also connected to the line F4 over which it receives the clock signal RCE from the sampling circuit associated with the regenerator module situated at the input to the monitored portion. A coincidence output from the comparator 40 is connected to the input of a coincidence counter 43 whose output is connected to a comparator 44. When the number of coincidences counted by the coincidence counter reaches a given value, e.g. 31, the comparator 44 delivers a "good connection" signal CBE. The output from the comparator 44 is connected to the wire F8 (FIG. 1). This output is also connected to a control input of an error counter 44 which has its output connected to the wire F10, and to an inverting input of an AND gate 41. A non-coincidence output from the comparator 40 is connected to the other input of the AND gate 41 and to an input to the error counter 42, and also to a reset to zero input of the coincidence counter 43. The output from the AND gate 41 is connected to the line F1 via an inverter 45 and also to the input of a non-coincidence counter 46 having its output connected to a comparator 47 which delivers a "bad connection" signal CME on a wire F9 when the number of non-coincidences counted by the non-coincidence counter 46 reaches a given value, e.g. 63. The line F5 is connected to a preset to zero input of the non-coincidence counter 46, to the comparator 47, to the coincidence counter 43 and to the comparator 44. The initialization signal INIT conveyed by the line F5 is delivered by the main marker MQP (FIG. 1) at the beginning of a check on a portion of the switching network.

The comparator 40 continuously compares the sample signals it receives from the input and the output of the monitored portion. The input sample signal ECE is delivered by one sampling circuit and the output sample signal ECS is delivered by another sampling circuit. These signals are conveyed over the lines F2 and F3 to the comparator 40 whose output delivers:

in the event of coincidence, a positive pulse to the coincidence counter 43 and a logic level 0 to the input of the AND gate 41; and in the event of non-coincidence, a positive pulse to the input of the AND gate 41 and a logic level 0 signal to the coincidence counter 43.

At the beginning of a checking operation, the initialization signal INIT resets to zero the non-coincidence counter 46, the coincidence counter 43 and the comparators 44 and 47, such that the good connection signal CBE and the bad connection signal CME are both set to 0.

The initialization signal INIT also synchronizes the dividers 23 (FIG. 7) of all the sampling circuits. Three processes then take place: phase synchronization; confirmation of synchronization; error counting.

PHASE SYNCHRNIZATION

The output signal from the comparator 44 is at logic level 0 and the AND gate 41 thus passes all non-coincidence pulses delivered by the comparator 40. To begin with the dividers 23 in the sampling circuits are all in a given phase state and a certain number of coincidences may be counted by the coincidence counter 43 by virtue of the binary character of the signals being sampled at the input and output of the monitored portion. However, a non-coincidence will soon appear and the comparator 40 will deliver a non-coincidence signal which resets the coincidence counter 43 to zero and delivers the phase adjusting control signal CRP to the line F1 to cause the sampling circuit taking samples from the output of the monitored portion to slip its phase. Finally, the non-coincidence counter 46 counts the non-coincidence detected by the comparator 40. The process of phase search is thus repeated several times until a phase is obtained when the same bits are being sampled at the input to and at the output from the monitored portion. The comparator 47 permanently compares the output from the non-coincidence counter 46 with a maximum value of 63 for example. If this maximum value is reached the comparator 47 delivers a bad connection signal CME and the checking operation is terminated.
W

CONFIRMATION OF SYNCHRONIZATION

The coincidences pulses delivered by the comparator 40 are counted by the coincidence counter 43 which is reset to zero each time non-coincidence is detected. The output from the coincidence counter 43 is permanently compared by the comparator 44 to a minimum value, e.g. 31. When this value is reached, a good connection signal CBE is delivered by the comparator and the following process may begin.

ERROR COUNTING

The good connection signal CBE at logic level 1 closes the AND GATE 41 so that no further phase correction is possible, and at the same time enables anticoincidence pulses to be counted by the error counter 42. The number of counted errors is permanently available on the wire F10 and is transmitted to the main marker MQP (FIG. 1).

A switching network in accordance with the invention enables any two two-way accesses to be interconnected in the manner described below.

SETTING UP A CALL

A central computer which is not an integral part of the invention determines the parameters of a path for interconnecting any pair of two-way accesses to the switching network, and delivers marking messages for activating the appropriate cross-points in the various matrices of the switching network.

These messages from the central computer are received by the main marker MQP which interprets them and sends elementary messages to the auxiliary markers MQ of the selection groups and of the third stage units concerned by the call. The auxiliary markers activate the matrices which are concerned as is well understood by the person skilled in the art.

High data rate digital signals then propagate in each direction through the switching network in which they regenerated. Assume, for example, that two subscribers to be connected are connected to the links L1 and L192 of the selection groups G1 and G16 (FIG. 1) and that these two selection groups are connected to each other by means of the third stage unit U1, in which case the digital signals are regenerated for transmission from the link L1 towards the link L192 as follows:

1—at the input to the selection group G1 by the regenerator module MRA1 of the set of regenerators A of the regenerator group RE1 connected to the link L1;
2—at the output from the selection group G1 by a regenerator module MRS of the set of regenerators B in one of the groups of regenerators, e.g. RS1;
3—at the input to the third stage unit U1 by a regenerator module MRA of a set of regenerators A in a group of regenerators, e.g. R3.15;
4—at the output from the third stage unit U1 by a regenerator module MRS of a set of regenerators B in a group of regenerators, e.g. R3.16;
5—at the input to the selection group G16 by a regenerator module MRA of a set of regenerators A of the group of regenerators RS1; and
6—at the output from the selection group G16 by a regenerator module MRS1 from the set of generators B of the group of regenerators RE1 connected to the link L1921.

In the opposite direction, i.e. from the link L1921 towards the link L1 there is a comparable path to the one described above but a third stage unit other than U1 could well be used.

It was assumed above that the two subscriber connections were connected to different selection groups. In the event that both subscriber connections belong to the same selection group there is no need to use a third stage unit since there is no need to interconnect two selection groups. In such a case the only regenerators used are those mentioned in paragraphs 1 and 6 above. In each selection group, each switching matrix m1 to m16 (FIG. 2) can interconnect two pairs of matrices M1 to M8 and can consequently interconnect the two subscriber lines thus avoiding the need to use a third stage unit.

CLEARING DOWN A CALL

Once the central computer has decided to end a call, it clears down the path established through the switching network by sending a clear down message to the main marker MQP, and the main marker passes along appropriate messages to the matrices involved via the auxiliary markers MQ.

PATH CHECKING

When the central computer needs to check a two-way path between two subscriber lines Li and Lj, it determines the regenerator modules at the ends of each of the single direction channels of the two-way path in question. The regenerator modules are MRAi and MRSj for one of the channels and MRAj and MRSi for the other channel, and these regenerator modules are in the regenerator groups REi and REj connected to the subscriber lines Li and Lj. The regenerator groups may or may not form part of the same selection group. After determining which are the appropriate regenerator modules, the central computer proceeds to perform successive tests on both channels. For each test it sends a set up test message to the main marker MQP, which message includes the addresses of the regenerator modules on the path. The main marker MQP sends a marking message MCP to the auxiliary markers MQ concerned and each of them sends a series message MCS to the sampling circuit connected to the regenerator module concerned. The regenerator module MRAi is connected in its selection group to the sampling circuit Pa and the generator module MRSj is connected in its selection group to the sampling circuit Pb. Each sampling circuit applies the number of the regenerator module required on its respective selection control line LCS. As indicated above with reference to FIGS. 5, 6 and 7, the regenerator module is then connected via the selector 11 of the set of regenerators A or B to which it belongs to the sampling circuit, and thence to the comparator circuit CC shown in FIG. 8. Once the selection operations have been performed, the main marker MQP delivers an initialization signal INIT to activate the test.

The digital signals at the input and at the output (regenerator modules MRAi and MRSj) are each sampled by the associated sampling circuit as has already been described with reference to FIG. 7, with the sampling circuit Pa associated with the regenerator module MRAi delivering an input signal ECE and the sampling circuit Pb associated with the regenerator module MRSj delivering an output sample signal ECS. In the sampling circuit Pb, the phase adjusting control signal CRP delivered by the comparator circuit CC serves to vary the sampling phase so as to slip through the output digital signal (from the regenerator module MRSj) relative to the sampling phase of the input digital signal (from the regenerator module MRAi). This relative slip serves to find coincidence between the input and output digital signals. The sampled signals ECE and ECS are processed by the comparator circuit CC which performs the three processes described above with reference to FIG. 8. These processes are: phase synchronization; confirmation of synchronization; and error counting.

The main marker MQP reads the results of the test as delivered by the comparator circuit over the wire F8 for the good connection signal CVE, over the wire F9 for the bad connection signal CME, and over the wire F10 for the error rate. Then, if necessary it activates the test on the other channel of the path between the subscriber connections Li and Lj, or a test on a path between two other subscriber connections.

The above description concerns a test over the complete path between the subscriber connections Li and Lj. This is thus an overall test of a path through the switching network. Obviously, it is possible to proceed by performing successive tests on each of the portions making up the path, which procedure is particularly useful in locating faults. In this context, each portion has a regenerator module at each end and a portion is considered as being that part of the path which extends between two successive regenerator modules.

It is also possible to monitor the quality of a channel or of both channels of a given path between two subscriber connections Li and Lj for any desired duration during a call. This is done by measuring the error rate on the portions constituting the or both of the channels.

The above description and drawings given purley by way of non-limiting example concern a switching network of the folded type which is equivalent to a five-stage network, with the selection groups constituting two stages in the direction of propagation towards the third stage as constituted by the third stage units, and two further stages in the opposite direction of propagation. Naturally, the switching network could have some other number of stages and need not necessarily be folded.

The intermediate connections are those which interconnect the switches of one stage to the switches of the next stage. In FIG. 1, the intermediate connections are those which connect the selection groups to the third stage units. In the selection groups, the matrices m1 to m16 of the sixteen selection groups G1 to G16 are switches of a single stage and constitute the second and the fourth stage of the switching network. Since the intermediate connections are two-way they are each constituted by two lines one for each direction of propagation. It is thus possible to say that there is a regenerator module at each end of an intermediate line. If the switching network is not folded, the intermediate lines are constituted by intermediate connections which are not two-way. Thus, in accordance with the invention, a switching network regardless of whether it is folded or not, comprises a regenerator module at each end, i.e. at the input and at the output, and a regenerator module at each end of the intermediate lines interconnecting the switches of one stage to the switches of the following stages, or more simply at each end of the intermediate lines interconnecting two stages.

We claim:

1. A space switching network for high data rate digital signals, the network having inlet lines and outlet lines connected thereto and comprising a plurality of stages with at least two consecutive stages being interconnected by a set of intermediate lines, each stage including switching matrices, said network further including regenerator modules, respectively at its inlets, at its outlets, and at each end of its intermediate lines, the regenerator modules at its inlets and at its outlets being connected to respective input lines and output lines, each regenerator module including means for recovering a clock rate from the high data rate digital signals passing therethrough and serving to correct amplitude, phase and wave shape degradation in the digital signals due to their passage through the inlet lines, the switching matrices and through the intermediate lines.

2. A switching network according to claim 1, further comprising a passive path monitoring device for bit-by-bit comparison of digital signals sampled at two points along a transmission channel, which two points delimit a portion of the said channel, said regenerator modules constituting sampling points for said digital signals, the monitoring device comprising sampling circuits connected to the regenerator modules and a comparator connected to the sampling circuits, the regenerator modules at the input to the switching network being connected to a first sampling circuit, the regenerator modules at the output of the switching network being connected to a second sampling circuit, each set of intermediate lines connecting two stages of the switching network being associated with an input sampling circuit and an output sampling circuit for the intermediate lines, said input sampling circuits being connected to the regenerator modules situated at the inputs of the intermediate lines and the said output sampling circuits being connected to to the regenerator modules situated at the outputs of said intermediate lines, each sampling circuit including sampling means for sampling the digital signal and a phase adjusting circuit for the sampled ditigal signal to provide independence from the propagation time of the digital signal between the two regenerator modules at the end of the portion being sampled, the comparator circuit comprising means for comparing the samples delivered by the sampling circuits associated with the regenerator modules of the said portion, means for recognizing that a transmission channel is properly established between the input and the output of the said portion, means for measuring the error rate over the said portion, and means for delivering a phase adjusting control signal, and means for recognizing when a channel is badly established over the said monitored portion.

3. A switching circuit according to claim 2, wherein the phase adjusting circuit is constituted by a NAND gate, first and second bistables, and a NOR gate, wherein the NAND gate has one input connected to the comparator circuit from which it receives a phase adjusting control signal and another input connected in the sampling circuit to a control circuit from which it receives a logic level 0 signal when the regenerator module to which it is connected is situated at the input end of a monitored portion and a logic level 1 signal when the regenerator module is situated at the output end of the monitored portion, wherein the first bistable has a clock input connected to the output of the NAND gate, a data input connected to receive a logic level 1 signal, and wherein the second bistable has a clock input connected to a clock recovery circuit in the sampling circuit which delivers a clock signal recovered from the digital signal being sampled, a data input connected to the output from the first bistable and has its output connected to the reset to zero of the first bistable and to one of the inputs of the NOR gate whose other input is connected to the clock recovery circuit and whose output is connected to the sampling means.

4. A switching network according to claim 2, wherein the sampling means are constituted by a divider and by a bistable, the divider having one input connected to the output from the phase adjusting circuit and the bistable having its clock input connected to the output from the divider, a data input receiving the digital signal for sampling and its output delivering samples from the digital signal to the comparator circuit.

5. A switching network according to claim 2, wherein the comparator circuit means for comparing the samples are constituted by a sample comparator having its inputs connected to each of the sampling circuits via a first line for conveying digital signal samples taken from the input to the monitored portion and via a second line for conveying digital signal samples taken from the output of the monitored portion, wherein the means for recognizing that a transmission channel is properly established between the input and the output of the portion being monitored are constituted by a coincidence counter and by a comparator, the counter being connected to a coincidence output from the sample comparator and the comparator being connected to the output from the coincidence counter and comparing the number of coincidences delivered by the coincidence counter with a fixed value to deliver a good connection signal when the number of coincidences reaches the said fixed value, wherein the means for measuring the error rate are consituted by an error counter having a count input connected to a non-coincidence output from the sample comparator and a control input connected to the output from the comparator of the means for recognizing that a channel is properly established, and wherein the means for recognizing that a transmission channel is badly established between the input and the output of the monitored portion are constituted by an AND gate, a non-coincidence counter, and a comparator, the AND gate having one input connected to the non-coincidence output from the sample comparator, an inverting input connected to the output from the comparator of the means for recognizing that a channel is properly established, and an output connected directly to the non-coincidence counter and via an inverter to a line which is connected to all the sampling circuits for conveying a phase adjusting control signal, the comparator being connected to the output from the non-coincidence counter and comparing the number of non-coincidences delivered by the non-coincidence counter with a fixed value and delivering a bad connection signal when the number of non-coincidences reaches the said fixed value.

* * * * *